Patented Sept. 20, 1938

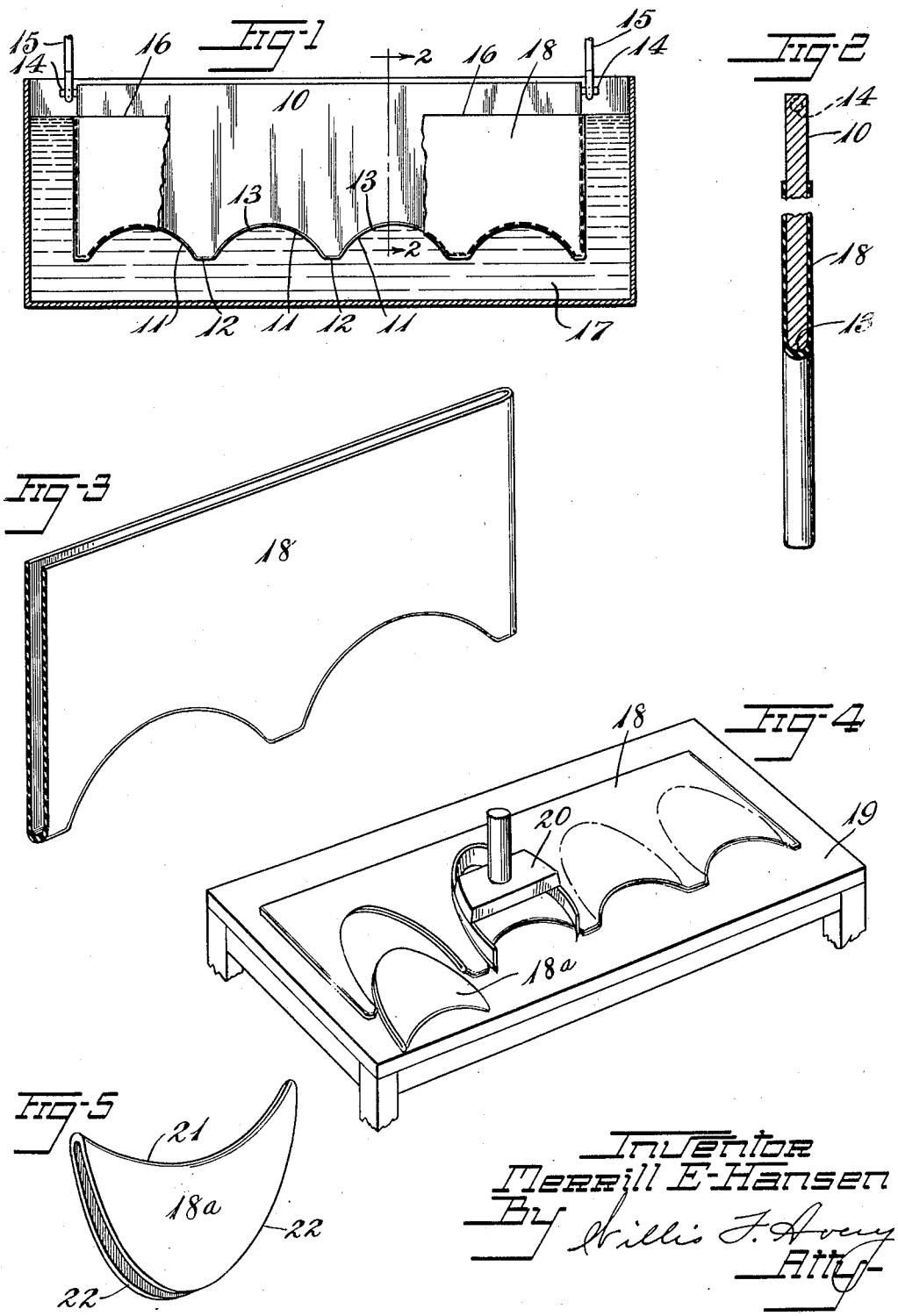

2,130,921

UNITED STATES PATENT OFFICE 2,130,921

MANUFACTURE OF DRESS SHIELDS

Merrill E. Hansen, Akron, Ohio, assignor to American Anode Inc., Akron, Ohio, a corporation of Delaware Application July 9, 1936, Serial No. 89,858

7 Claims. (Cl. 18—58)

This invention relates to the manufacture of dress shields and particularly to the manufacture of the rubber elements of dress shields, known in the trade as plates, which usually consist of two crescentiform sheet rubber flaps joined together along their concave margins, and has for its principal objects the provision of economical and efficient procedure for making such dress shield plates having a leak-proof, one-piece, seamless rubber structure embodying the high quality characteristics of rubber deposited in final form directly from an aqueous dispersion of rubber such as natural rubber latex, and also the provision of a novel deposition form for use in such procedure. Other objects and features of the invention will be apparent from the following description of the invention in which reference will be had to the accompanying drawing, of which Fig. 1 is an elevation, partially in section, illustrating an early step in the present process and showing the novel deposition form of the invention immersed in a liquid dispersion of rubber with a deposit of rubber thereon, the rubber deposit being partially broken away for clarity of illustration;

Fig. 2 is a vertical section taken on line 2—2 of Fig. 1;

Fig. 3 is a vertically sectioned, fragmentary perspective view of a step-product in the present process;

Fig. 4 is a perspective view illustrating a subsequent step in the process; and

Fig. 5 is a perspective view of a finished rubber dress-shield plate made according to the present invention.

The deposition form constituting an important part of the invention preferably comprises a generally rectangular, preferably planar, element 10, about ⅛" to ¼" in thickness, having a series of arcuate indentations 11, 11 preferably slightly spaced apart as at 12, 12 and uniformly disposed along one of the longer margins of the form providing a reversely-scalloped edge. The arcuate indentations are shaped to produce, in the manner to be described, a dress shield which will fit snugly over the armpit of a dress, and, to enhance such snug fitting, the arcuate edges are gently rounded transversely as indicated at 13. The form may be provided with supporting means such as the lugs 14, 14, preferably extending horizontally from the top corners of the form opposite the reversely-scalloped edge for engagement with hooks 15, 15 of a suitably dipping machine. The form may be made of any suitable, preferably rigid, material such as metal, glass, hard rubber, Bakelite, porcelain, wood, etc. and may be pre-treated or prepared for use in any well known manner.

In manufacturing dress shield plates according to a preferred procedure, the form 10 is immersed, reversely-scalloped edge down, to a line below the top edge of the form as indicated at 16, 16, in a liquid dispersion of rubber such as a suitably compounded natural rubber latex 17, and a deposit of rubber 18, preferably about 0.005" thick (when finished), is produced upon the immersed portions of the form by any suitable method such as simply dipping one or more times with intermediate drying of the deposit, or the use of coagulants applied either to the form before dipping or to the deposited rubber, the use of suction in conjunction with porous forms, or electro-phoretic means, etc. For efficiency and uniformity of deposition and for ease in stripping the deposited rubber from the form, however, I preferably first coat the form with a thin film of a composition containing a latex coagulant and a finely divided water insoluble material such as soapstone in a volatile solvent, then evaporate a portion of the solvent to produce a non-flowing film on the form, and thereafter immerse the coated form in latex as described in U. S. Patent No. 1,924,214, granted August 29, 1933, to Edwin B. Newton. The form together with the adherent rubber deposit 18, and some uncoagulated latex associated with the surface of the rubber deposit, then is withdrawn from the dipping tank and the form is held with the reversely-scalloped edge down until drainage of the uncoagulated latex has substantially ceased, which usually will require one to three minutes time. Some of the uncoagulated latex will drip off the form but a substantial quantity will remain as droplets adhering to the lowermost portions of the deposit along the edges 12, 12 between the arcuate indentations and, in some instances, along the arcuate edges as well. Preferably these droplets are distributd along the arcuate edges of the deposit as by rotating the form and deposit in the plane of the form first in one direction to a vertical position and then in the opposite direction to a vertical position, which will cause the rubber deposit to be heavier along the arcuate margin providing reenforcement at the armpit portion of the finished dress shield element. Next the deposited rubber is washed, dried, vulcanized and stripped from the form according to conventional procedure to produce, as more clearly shown in Fig. 3, a generally rectangular and relatively narrow bag-like rubber article having a reversely-scalloped bottom.

As the next step in the process, a series of dress-shield plates 18a, 18a are cut from the rubber bag in such manner as to include in each plate one of the arcuate indentations of the reversely-scalloped bag bottom. This cutting preferably is accomplished by laying the rubber bag 18 flat upon a cutting table 19, and by means of a generally parabolic cutting die 20, cutting through both side sheets of the bag along a generally parabolic line extending symmetrically from a point adjacent an end of one of the arcuate indentations to a point adjacent the other end of the indentation so that in the finished plate, illustrated in Fig. 5, the arcuate indentation forms a concave rounded line of joinder 21 between two sheet rubber flaps 22, 22. Permissibly, a plurality of the flat rubber bags may be stacked symmetrically and die-cut simultaneously to effect further savings in time and labor.

It will immediately be appreciated from the foregoing that a finished rubber dress-shield plate made according to the present invention embodies a one-piece entirely seamless unmasticated latex rubber structure which completely eliminates any possibility of leakage which frequently has occurred in prior plates consisting of two separately prepared crescentiform rubber flaps cut-seamed along their concave margins. Furthermore, the high quality of the unmasticated latex rubber structure deposited in final form directly from the aqueous dispersion of rubber permits repeated washing and rough usage of the shield without substantial damage thereto. The rubber plate may, if desired, be associated with and sewed into an enveloping textile fabric cover formed of four crescentiform fabric pieces suitably stitched together according to well-known practice.

The present invention provides for the rapid and efficient manufacture of large numbers of superior quality rubber dress shield plates with little waste of material and minimum of labor cost and without the necessity of any but the simplest and most inexpensive equipment. Substantial production economies accordingly are effected without loss but in fact with substantial gain in quality of the product.

The term "liquid dispersion of rubber" as used in the specification and claims is intended to include all flowable dispersions of rubber and analogous natural or synthetic products in liquid vehicles, either solvents or non-solvents of rubber, and including the so-called "rubber cement" solvent solutions of rubber as well as natural or artificially prepared aqueous dispersions such as natural rubber latex. All such liquid dispersions of rubber may include any desirable compounding, vulcanizing, age-resisting, coloring, stabilizing, or thickening agents, or like conditioning materials, and may be diluted, concentrated, or otherwise prepared for use.

While the invention has been described in considerable detail with reference to preferred procedures, apparatus, and materials, the invention is not limited thereto and is subject to numerous modifications and variations which may be made without departing from the spirit and scope of the invention as defined by the appended claims.

I claim:

1. The method of making a rubber dress-shield plate which comprises producing, by deposition from a liquid dispersion of rubber upon a suitable form, a rubber deposit comprising two opposed sheet faces meeting along a seamless line of joinder defining an arcuate indentation, and cutting through the two faces along a continuous line extending from one point in the line of joinder of the two faces to another point in said line and enclosing a substantial area of each of the said sheets adjacent the said line.

2. The method of making a rubber dress-shield plate which comprises producing a relatively narrow seamless rubber bag having a closed margin including at least one arcuate indentation, and cutting through two walls of the bag along a continuous line extending from a point in said margin to another point in said margin and enclosing a substantial area of the walls adjacent the indentation.

3. The method of making rubber dress-shield plates which comprises producing a relatively narrow seamless rubber bag having a reversely-scalloped closed margin including a plurality of arcuate indentations, and cutting through two walls of the bag along a plurality of lines, each of which defines a substantial area adjacent one of said arcuate indentations, to produce a plurality of dress shields.

4. The method of making a rubber dress-shield plate which comprises producing a relatively narrow seamless rubber bag having a closed margin including at least one arcuate indentation, placing the bag flat upon a surface, and die-cutting through two walls of the bag along a sweeping line enclosing substantial areas of the bag walls adjacent said indentation.

5. The method of making a rubber dress-shield plate of one-piece seamless structure embodying two crescentiform sheet flaps joined along their concave margins and being reenforced along said joinder, which comprises providing a generally planar form having a margin including at least one arcuate indentation, coating the form with a flowable liquid dispersion of rubber, substantially solidifying a portion of the dispersion upon the form, supporting the form in such position that excess unsolidified dispersion will drain toward said indented margin, after such flow has substantially ceased, but before substantial drying has occurred, distributing the excess dispersion along the arcuate margin, thereafter drying the deposit, and cutting the deposit along a sweeping line enclosing a substantial area adjacent the indentation.

6. The method of making a rubber dress-shield plate which comprises forming from a rubber composition a step-product comprising two opposed sheet faces meeting along a seamless line of joinder defining an arcuate indentation conforming to the concave margin of a dress-shield, and cutting from the step-product a dress-shield plate including said indentation.

7. The method of making rubber dress-shield plates which comprises forming from a rubber composition a step-product comprising two opposed sheet faces meeting along a seamless line of joinder defining a plurality of arcuate indentations, each conforming to the concave margin of a dress shield, and cutting a plurality of dress-shield plates from the step-product in such manner as to include one of said indentations as the concave margin of each plate cut from the step-product.

MERRILL E. HANSEN.